(12) United States Patent
Morilhat et al.

(10) Patent No.: US 8,752,862 B2
(45) Date of Patent: Jun. 17, 2014

(54) CUSHIONING ELEMENT

(75) Inventors: Philippe Morilhat, Strasbourg (FR); Paul Quirin, Illkirch (FR)

(73) Assignee: Johnson Controls Technology Company, Holland, MI (US)

(*) Notice: Subject to any disclaimer, the term of this patent is extended or adjusted under 35 U.S.C. 154(b) by 3 days.

(21) Appl. No.: 13/500,529

(22) PCT Filed: Sep. 22, 2010

(86) PCT No.: PCT/EP2010/005792
§ 371 (c)(1),
(2), (4) Date: Jun. 29, 2012

(87) PCT Pub. No.: WO2011/042119
PCT Pub. Date: Apr. 14, 2011

(65) Prior Publication Data
US 2012/0261913 A1    Oct. 18, 2012

(30) Foreign Application Priority Data

Oct. 7, 2009  (DE) .......................... 10 2009 048 593
May 27, 2010  (DE) .......................... 10 2010 021 689

(51) Int. Cl.
*B60R 21/207* (2006.01)
*B60R 21/216* (2011.01)
*B60R 21/2165* (2011.01)
*B60N 2/42* (2006.01)

(52) U.S. Cl.
USPC ................. 280/728.3; 280/730.2; 297/216.13

(58) Field of Classification Search
CPC  B60R 21/207; B60R 21/216; B60R 21/2165; B60N 2002/5808
USPC ............. 280/728.3, 730.1, 730.2, 743.2, 751; 297/216.1, 216.13
See application file for complete search history.

(56) References Cited

U.S. PATENT DOCUMENTS 5,398,959 A * 3/1995 Avila .......................... 280/728.3
(Continued)

FOREIGN PATENT DOCUMENTS

DE   10254377 B3   3/2004
DE   10260988 A1   7/2004
(Continued)

OTHER PUBLICATIONS

International Search Report for application No. PCT/EP2010/005792 mailed Apr. 19, 2010.
(Continued)

*Primary Examiner* — Faye M Fleming
*Assistant Examiner* — Laura Freedman
(74) *Attorney, Agent, or Firm* — Fletcher Yoder, P.C.

(57) ABSTRACT

A cushioning element, such as for a vehicle occupant protection device, comprises a cover, a filling material and at least one textile sheet. The textile sheet is foam-encapsulated in addition to the cover. Opening of the cover takes place reliably and reproducibly when an inflatable occupant protection device is activated. The textile sheet influences the opening of the cover when the inflatable device is activated.

4 Claims, 2 Drawing Sheets

(56) References Cited

U.S. PATENT DOCUMENTS

Figure 1:
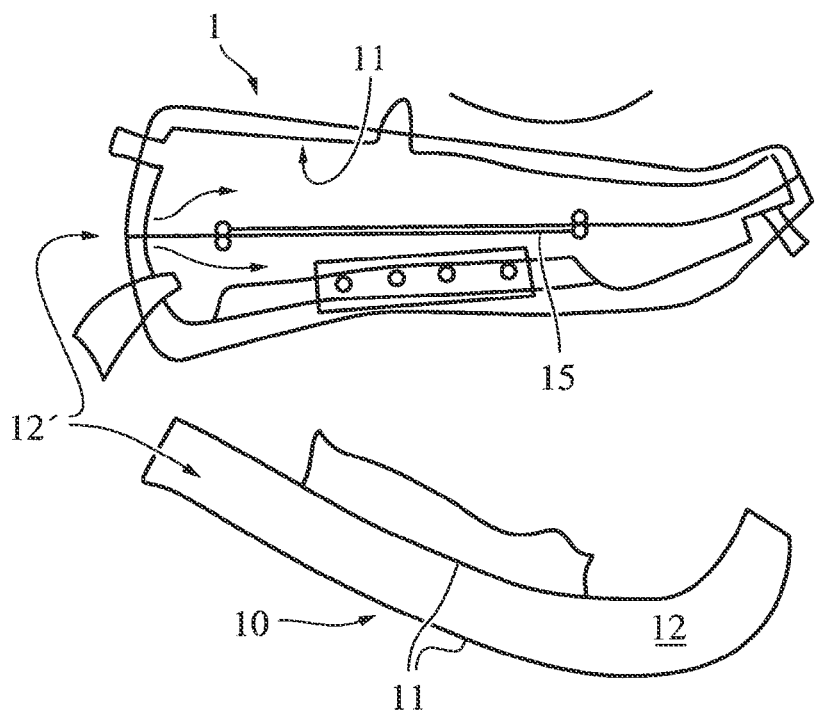

| | | | |
|---|---|---|---|
| 5,639,115 A * | 6/1997 | Kelley et al. | 280/728.3 |
| 5,749,597 A * | 5/1998 | Saderholm | 280/728.2 |
| 5,762,363 A * | 6/1998 | Brown et al. | 280/730.2 |
| 5,775,727 A * | 7/1998 | Sun et al. | 280/728.3 |
| 5,863,063 A * | 1/1999 | Harrell | 280/730.2 |
| 5,893,579 A * | 4/1999 | Kimura et al. | 280/730.2 |
| 5,967,603 A * | 10/1999 | Genders et al. | 297/216.13 |
| 6,045,151 A * | 4/2000 | Wu | 280/728.3 |
| 6,254,122 B1 * | 7/2001 | Wu et al. | 280/730.2 |
| 7,100,941 B2 * | 9/2006 | Riha et al. | 280/728.3 |
| 7,448,643 B2 * | 11/2008 | Kuettner et al. | 280/728.3 |
| 7,543,847 B2 * | 6/2009 | Tracht | 280/730.2 |
| 7,654,612 B2 * | 2/2010 | Tracht et al. | 297/216.13 |
| 8,167,333 B2 * | 5/2012 | Tracht et al. | 280/730.2 |
| 2006/0113763 A1 | 6/2006 | Tracht et al. | |
| 2006/0151919 A1 | 7/2006 | Renner et al. | |
| 2006/0231536 A1 | 10/2006 | Griebel et al. | |
| 2008/0073952 A1 * | 3/2008 | Tracht et al. | 297/216.13 |

FOREIGN PATENT DOCUMENTS

| | | |
|---|---|---|
| DE | 102005005886 A1 | 9/2005 |
| DE | 102004044256 | 3/2006 |
| DE | 102005057443 A1 | 6/2006 |
| DE | 102005057415 | 7/2006 |
| DE | 102007026182 | 2/2008 |
| DE | 102008049502 A1 | 4/2010 |
| JP | H08258660 A | 10/1996 |
| JP | H10310017 A | 11/1998 |
| JP | 2000043669 A | 2/2000 |
| JP | 2001513728 A | 9/2001 |
| JP | 2006522687 A | 10/2006 |

OTHER PUBLICATIONS

Japanese Office Action dated Aug. 20, 2013.
Korean Office Action dated Jun. 21, 2013.
German Search Report dated Jul. 12, 2013.

* cited by examiner

CUSHIONING ELEMENT

CROSS REFERENCE TO RELATED APPLICATIONS

This application claims priority from and the benefit of PCT Application No. PCT/EP2010/005792, filed on Sep. 22, 2010; German Patent No. DE 10 2009 048 593.7, filed on Oct. 7, 2009; and German Patent DE 10 2010 021 689.5, filed on May 27, 2010; all entitled "Cushioning Element", which are herein incorporated by reference.

BACKGROUND

The present invention relates to a cushioning element, in particular for a vehicle seat. More specifically, the invention relates to an arrangement and a method for producing a cushioning element, the cushioning element having an inflatable occupant protection device.

SUMMARY

There are known methods for producing padded cushioning elements which use covers that are molded or foam-encapsulated in situ.

It is an object of the present invention to provide a cushioning element and a method for producing a cushioning element, a cover of the cushioning element which is molded in situ being provided or a foam-encapsulated cover being used, and an inflatable occupant protection device interacting with the cushioning element in such a way that the cover is opened when the inflatable occupant protection device is activated. According to the present invention, the filling material is introduced into the cover in a liquid state, i.e. by what is known as the pour-in-place technique.

The object is achieved by a cushioning element comprising a cover, a filling material and at least one textile sheet that is foam-encapsulated in addition to the cover, opening of the cover taking place reliably and reproducibly when an inflatable occupant protection device is activated, the at least one textile sheet being intended to influence the opening of the cover when the inflatable occupant protection device is activated.

In this way it is advantageously possible according to the invention that specific opening of the cover is possible, and consequently that there is a particularly dependable protective effect due to the occupant protection device.

The object is also achieved by a cushioning element comprising a cover and at least one textile sheet that is foam-encapsulated in addition to the cover in such a way that the opening of the cover takes place reliably and reproducibly when the inflatable occupant protection device is activated.

According to the invention, it is preferred that the outer side of the cushioning element has an A side (visible side) and a B side (non-visible side), the opening of the cover taking place from the B side of the cushioning element when the inflatable occupant protection device is activated. In this way it is easily possible according to the invention that the cushioning element has an attractive appearance and nevertheless that a great protective effect is achieved in the event of an accident by the triggering of the inflatable occupant protection device.

According to the invention, it is also preferably provided that the at least one textile sheet is joined to the cover at a join, the join corresponding to the inner side of the cover on the A side of the cushioning element. Alternatively or in addition to this, it is preferred according to the invention that the at least one textile sheet is joined to the cover at a join, the join corresponding to the inner side of the cover on the B side of the cushioning element. This allows the at least one textile sheet to be attached on any side of the cushioning element, so that a variety of configurations are advantageously possible.

It is also preferred according to the invention that the at least one textile sheet extends through the cover on the B side of the cushioning element. In this way it is advantageously possible that, by means of either one or two ends hanging out from the cover, the textile sheet is either joined directly to the inflatable occupant protection device or else is attached to an element joined to the inflatable occupant protection device, for instance an airbag firing frame or the like.

The present invention also relates to a system made up of a cushioning element and an inflatable occupant protection device, the cushioning element having a cover, a filling material and at least one textile sheet that is foam-encapsulated in addition to the cover, and opening of the cover taking place reliably and reproducibly when the inflatable occupant protection device is activated, the at least one textile sheet being intended to influence the opening of the cover when the inflatable occupant protection device is activated.

By means of such a system, it is advantageously possible according to the invention that the cushioning element is fitted in the motor vehicle in an attractive way and nevertheless that effective protection of the occupants by the inflatable occupant protection device is ensured.

DRAWINGS

The invention is explained in more detail below on the basis of graphically represented exemplary embodiments, from which further advantages and features emerge.

Figure 2:
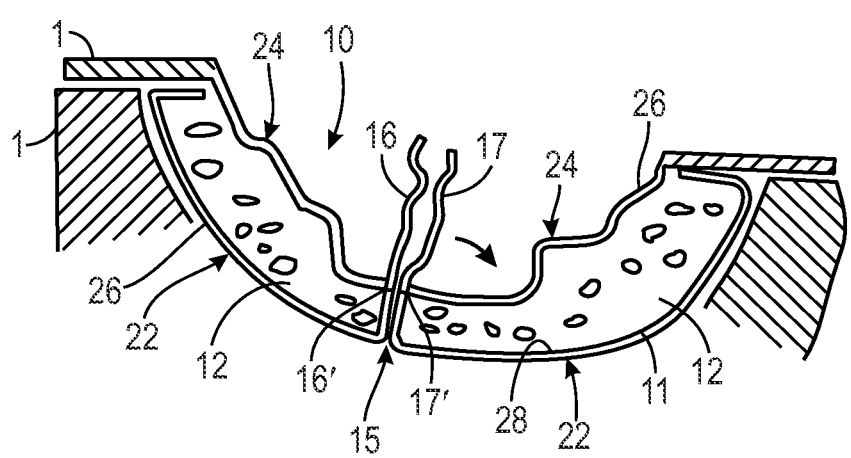
Figure 3:
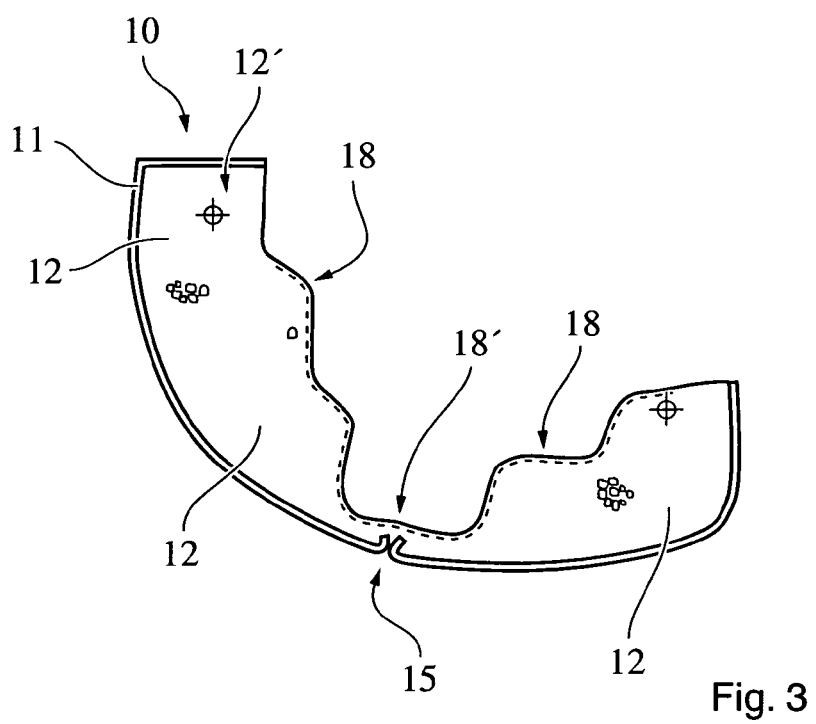

FIG. 1 shows a schematic sectional view of a mold for producing a cushioning element by the method according to the invention and a cushioning element in which a cover is provided or filled with a foam material and the foam material being molded into the cover, i.e. in situ, FIG. 2 shows a schematic cross-sectional view transversely to the main direction of extent of the cushioning element according to a first embodiment of the present invention, and FIG. 3 shows a schematic cross-sectional view transversely to the main direction of extent of the cushioning element according to a second embodiment of the present invention.

DETAILED DESCRIPTION

In FIG. 1, a cushioning element 10 (lower part of FIG. 1) and a mold 1 (upper part of FIG. 1) is schematically represented, the mold 1 serving for producing the cushioning element 10. This involves placing a cover 11 of the cushioning element 10 in the mold 1 and at least partially filling it with a filling material 12, in particular a foam material 12. This obviates the need for the cover 11 to be covered over with a preformed foam element, but instead the filling material 12 or the foam material 12 is introduced into the cover 12 in situ. The directions in which the filling material 12 is introduced are schematically represented by means of arrows 12'.

According to the present invention, the cushioning element 10 has a predetermined breaking point 15, in particular a seam 15, which is opened when an inflatable occupant protection device is activated. Such an inflatable occupant protection device is also referred to hereafter as an airbag. In a known way, the airbag has a module which comprises an air cushion which emerges from the predetermined breaking point 15 of the cushioning element 10 to protect vehicle occupants when the airbag is activated.

In FIGS. 2 and 3, schematic cross-sectional views transversely to the main direction of extent of the cushioning element 10 are respectively represented, the cross-sectional representation in FIG. 2 also including the mold 1, while in FIG. 3 only the cushioning element 10 is represented. Here, FIG. 2 represents a first embodiment of the present invention and FIG. 3 represents a second embodiment of the present invention.

According to the first embodiment of the invention, represented in FIG. 2, first and second textile sheets 16, 17 are attached to the cover 11 of the cushioning element 10 in the region of the predetermined breaking point 15, the first textile sheet 16 being fastened at a joint 16' on one side of the predetermined breaking point 15 (which tears open in the case where the airbag is activated) and the second textile sheet 17 being fastened at a joint 17' on the opposite side of the predetermined breaking point 15 (which tears open in the case where the airbag is activated). As illustrated, the cushioning element 10 includes an A side 22 (visible side) and a B side 24 (non-visible side). In addition, the cover 11 includes an outer side 26 and an inner side 28. In the illustrated embodiment, the first and second joints 16' and 17' are formed on the inner side 28 of the cover 11 on the B side 24 of the cushioning element 10. In the case where the airbag is activated, it is ensured by this configuration that the cushioning element 10 and the cover 11 allow or enable the airbag to deploy in a dependable way.

According to the second embodiment of the invention, represented in FIG. 3, a third textile sheet 18 is arranged in a region of the cushioning element 10 opposite from the predetermined breaking point 15, the third textile sheet 18 being molded into the cushioning element 10, or joined to the cushioning element 10, together with the introduction of the filling material 12. The third textile sheet 18 has in the region directly opposite from the predetermined breaking point 15 an opening or a slit 18', which has the effect that dependable and reproducible opening of the predetermined breaking point, and consequently deployment of the airbag, is possible by simple means.

LIST OF REFERENCE SYMBOLS

1 mold
10 cushioning element
11 cover
12 filling material/foam material
12' arrows
15 predetermined breaking point/seam
16 first textile sheet
16' fastening point
17 second textile sheet
17' fastening point
18 third textile sheet
18' slit

The invention claimed is:

1. A cushioning element comprising a cover, a filling material disposed on an inner side of the cover, and at least one textile sheet that is foam-encapsulated in addition to the cover, wherein the cushioning element has a visible A side formed by an outer side of the cover, opposite the inner side of the cover, and a non-visible B side formed by the outer side of the cover, opening of the cover takes place from the B side of the cushioning element when an inflatable occupant protection device is activated, the at least one textile sheet influences the opening of the cover when the inflatable occupant protection device is activated, and the at least one textile sheet is joined to the cover at a joint, the joint corresponding to the inner side of the cover on the B side of the cushioning element.

2. The cushioning element as claimed in claim 1, wherein the at least one textile sheet extends through the cover on the B side of the cushioning element.

3. A system comprising a cushioning element and an inflatable occupant protection device, the cushioning element having a cover, a filling material disposed on an inner side of the cover, and at least one textile sheet that is foam-encapsulated in addition to the cover, wherein the cushioning element has a visible A side formed by an outer side of the cover, opposite the inner side of the cover, and a non-visible B side formed by the outer side of the cover, opening of the cover takes place from the B side of the cushioning element when the inflatable occupant protection device is activated, the at least one textile sheet influences the opening of the cover when the inflatable occupant protection device is activated, and the at least one textile sheet is joined to the cover at a joint, the joint corresponding to the inner side of the cover on the B side of the cushioning element.

4. The system as claimed in claim 3, wherein the at least one textile sheet extends through the cover on the B side of the cushioning element.

* * * * *